United States Patent
Antikidis et al.

(10) Patent No.: US 8,928,751 B2
(45) Date of Patent: Jan. 6, 2015

(54) COMPRESSION OF EARTH OBSERVATION SATELLITE IMAGES

(75) Inventors: Jean-Pierre Antikidis, Castanet (FR); Jean-Jacques Favier, Montastruc la Conseillere (FR)

(73) Assignee: Centre National d'Etudes Spatiales (CNES), Paris (FR)

( * ) Notice: Subject to any disclaimer, the term of this patent is extended or adjusted under 35 U.S.C. 154(b) by 984 days.

(21) Appl. No.: 13/061,179

(22) PCT Filed: Aug. 21, 2009

(86) PCT No.: PCT/FR2009/051615
§ 371 (c)(1),
(2), (4) Date: Apr. 11, 2011

(87) PCT Pub. No.: WO2010/023397
PCT Pub. Date: Mar. 4, 2010

(65) Prior Publication Data
US 2011/0187860 A1  Aug. 4, 2011

(30) Foreign Application Priority Data
Aug. 28, 2008  (FR) .................................. 08 04741

(51) Int. Cl.
*H04N 7/18* (2006.01)
*H04N 19/14* (2014.01)
*H04N 19/154* (2014.01)
*H04N 19/85* (2014.01)
*B64G 1/10* (2006.01)

(52) U.S. Cl.
CPC ....... *H04N 19/00157* (2013.01); *H04N 19/002* (2013.01); *H04N 19/0078* (2013.01); *H04N 19/00903* (2013.01); *B64G 1/1021* (2013.01)
USPC .......................................... 348/144

(58) Field of Classification Search
CPC .................. H04N 19/00157; H04N 19/00078; H04N 19/00903; H04N 19/002; B64G 1/1021
USPC .................. 348/143, 144, 584; 382/100, 239
See application file for complete search history.

(56) References Cited

U.S. PATENT DOCUMENTS

| | | | | |
|---|---|---|---|---|
| 6,031,939 A | * | 2/2000 | Gilbert et al. | 382/239 |
| 6,803,968 B1 | * | 10/2004 | Numata | 348/584 |
| 2008/0166011 A1 | * | 7/2008 | Sever et al. | 382/100 |

OTHER PUBLICATIONS

Murroni M et al., "Region-based image coding for remote sensing" Image Processing and Its Applications, 1999, Seventh International Conference on (Conf. Publ. No. 465) Manchester, US Jul. 13-15, 1999, London, US, IEE, UK, vol. 2, Jul. 13, 1999, pp. 808-812, XP006501151, ISBN: 978-0-85296-717-1, Section "Ourline of the Algorithm", pp. 809-810.

(Continued)

*Primary Examiner* — Allen Wong
(74) *Attorney, Agent, or Firm* — Young & Thompson

(57) ABSTRACT

A method of acquiring, compressing and transmitting satellite images, characterized in that in a systematic manner: an image is acquired (101); (102) the image is processed by an image preprocessing step providing a value characteristic of the image and an image preprocessed by recognizing predetermined natural objects in the acquired image and replacing the natural objects by standard objects; the characteristic value is compared (103) with a table of values, each value of which is associated with a compression algorithm; the compression algorithm corresponding to the characteristic value is implemented (104) by compression elements for compressing the image; the compressed image is transmitted (105) to a remote image reception device by transmission elements.

18 Claims, 3 Drawing Sheets

(56) References Cited

OTHER PUBLICATIONS

Figure 1:
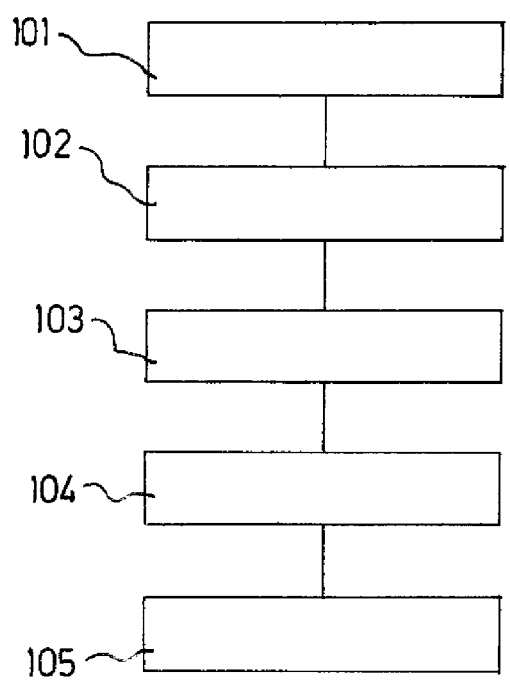

Stewart R J et al., "An adaptive technique to maximize lossless images data compression of satellite images", Robotics and Computer Integrated Manufacturing, Elsevier Science Publishers BV., Barking, GB, vol. 11, No. 2, Jun. 1, 1994, pp. 111-115, XP004011783, ISSN: 0736-5845, the whole document.

International search report dated Dec. 29, 2009 in corresponding PCT/FR2009051615.

* cited by examiner

COMPRESSION OF EARTH OBSERVATION SATELLITE IMAGES

BACKGROUND OF THE INVENTION

1. Field of the Invention

The invention relates to a method for acquisition, reduction and transmission of Earth observation satellite images, and more particularly to a method for acquisition, reduction and transmission of Earth observation satellite images employed on board a satellite, particularly in low orbit.

2. Description of the Related Art

An Earth observation satellite, in particular a satellite in low orbit, intended to take systematic images of the globe is capable of acquiring a large number and variety of images in a relatively short time interval. This variety of images results in particular from the fact that these satellites fly over various regions of the globe during their orbits, inter alia oceans, deserts, cities, forests, polar regions, etc. There are instruments fitted on board satellites which are intended to acquire only one particular type of region, for example the MERIS instrument fitted on the ENVISAT satellite, which is intended to measure the color of the oceans. It is known to provide the satellites with means for determining the periods during which each instrument for acquisition of data, in particular images, carried by the satellite does not have to acquire images because the overflown regions do not correspond to the intended objective of this instrument. This furthermore makes it possible to limit the bandwidth and not to use the resources needlessly. For each instrument, these non-observation periods are generally defined by the coordinates of the regions not to be observed. These excluded regions may, depending on the intended objective of the instrument, be oceans, forests, cities, poles, etc. Furthermore, for instruments which operate in the visible spectrum, these excluded regions may also comprise regions in which it is night-time. This is because during a part of its orbit, a satellite flies over regions in which it is night-time and for which the acquisition of images is not of interest.

Therefore, in the known methods:

means for identifying the geographical regions flown over determine whether acquisition of an image of an overflown region is to be carried out, acquisition of an image of this region is carried out if the identification means have determined that an image of this overflown region should be acquired, this image is compressed by image compression means, this compressed image is transmitted to a remote image reception device.

The means for identifying the geographical regions flown over make it possible to exclude a certain number of geographical regions of the globe. This technique of excluding certain geographical regions of the globe forms an integral part of the strategy of limiting the bandwidth necessary for transmitting the data acquired by an instrument to the ground. This limitation of the bandwidth is also obtained by compressing the images actually acquired, before they are transferred to the ground. This compression of the images may be obtained by a wide variety of compression algorithms, inter alia algorithms of the JPEG, JPEG2000 type, etc.

The Inventors have determined that the drawback of these known methods resides on the one hand in the fact that certain regions of the globe are totally ignored even though they may be of interest, and on the other hand in the fact that the compression algorithm is not adapted to the acquired images. This is the case for example with oceans, which are generally removed from protocols for observing regions of human activity, even though images of these regions could reveal relevant and useful data, such as boats, oil platforms, etc.

Furthermore, definition of the regions to be excluded is a relatively complex task, in particular for satellites in low orbit given that it involves the orbit of the satellite, the rotation of the Earth, etc. Furthermore, unless meteorological data are communicated constantly to the satellite, the meteorological conditions will not be known to the satellite so that the instrument is liable to acquire and transmit cloudy images which are of no interest.

Furthermore, the quality of the compression of an image provided by the known compression methods depends on the type of image to be compressed. In particular, the Inventors have determined that an algorithm which is effective at compressing an image of a large city is not suited to compressing an image of the tropical forest.

U.S. Pat. No. 6,031,939 describes a method for optimizing the compression of image data with automatic selection of the compression conditions. In this method, a plurality of compression algorithms are evaluated in relation to the images to be compressed, or test images, and the algorithm to be used is determined automatically on the basis of parameters representative of the objective of the user, selected by him, and after evaluation for each algorithm. Various algorithms may be applied to different portions of the same image. Likewise, the publication "An adaptive technique to maximize lossless image data compression of satellite images" XP004011783 describes techniques for lossless compression of satellite images, which are based only on the analysis of technical parameters (entropy, texture, regularity of the patterns, etc.) of the images. Different coding techniques are applied as a function of the different entropies of the various regions of the image. The compression performance of these methods remains limited by the fact that only a purely technical analysis of the image (luminosity, texture, contrast, etc.) is carried out.

SUMMARY OF THE INVENTION

There is therefore a genuine need to provide a method for acquisition, reduction and transmission of Earth observation images, which can permit acquisition of images of any region of the globe and image reduction adapted to the type of objects observed, with a view to obtaining transmission which makes it possible to go even further in the reduction of the bandwidth, that is to say which has superior performance in terms of compression.

It is also an object of the invention to provide a method which is compatible with its integration on board a spatial system, which in particular is simple and can be employed rapidly by standard digital processing resources.

It is an object of the invention to provide such a method for acquisition, reduction and transmission of Earth observation images employed on board a satellite which, with an equivalent amount of transmitted information, permits reduced use of the bandwidth.

It is also an object of the invention to provide such a method employed on board a satellite which, with an equivalent bandwidth, can transmit more information than by a method of the prior art.

It is also an object of the invention to provide a method for acquisition, reduction and transmission of Earth observation images which is adapted to the regions overflown by a satellite.

It is also an object of the invention to provide such a method, the compression step of which implements a specific compression method as a function of each image acquired by the satellite.

It is also an object of the invention to provide such a method which obviates the need for a satellite implementing this method to have a specific day/night program which prevents imagery at night.

It is also an object of the invention to provide such a method which obviates the need for a satellite implementing this method to have a specific program for analyzing the weather forecast in order to determine whether cloud cover is liable to hinder imagery.

To this end, the invention relates to a method for acquisition, reduction and transmission of Earth observation satellite images, wherein, systematically:
- an image is acquired by an instrument carried by this satellite,
- this image is processed by an image preprocessing step adapted to provide a preprocessed image and at least one numerical value, referred to as the characteristic value of the image, representative of the content of the image, the preprocessing step comprising a step of recognizing predetermined natural objects in the acquired image and a subsequent step of substituting standardized objects for these natural objects,
- said characteristic value is compared with a table of values, each value of which is associated with a compression algorithm,
- the compression algorithm corresponding to said characteristic value is employed by compression means in order to compress said preprocessed image,
- said compressed image is transmitted by transmission means to a remote image reception device.

A method according to the invention allows all types of optical instruments carried by a satellite to carry out systematic acquisitions of the overflown regions, but without overloading the bandwidth for transmission of the images to a remote device. Furthermore, with a method according to the invention it is not necessary to determine before the acquisition of an image whether acquisition of the region being overflown is to be carried out. In particular, a method according to the invention evaluates a characteristic value of the image for each image acquired by the observation instrument. This value may be representative of the spectrum of the image, the contrast of the image, the luminosity of the image or the texture of the image, and may in general be defined by all types of image processing algorithms. This characteristic value is then compared with a table of predetermined characteristic values. These predetermined values correspond to all the types of images which can be acquired by the instrument. For example, certain characteristic values correspond to images totally obscured by the presence of clouds, others correspond to images of oceans and others to images of deserts, etc. These predetermined characteristic values are defined by experience and are stored in a memory fitted on board the satellite. Said table of values is therefore established and stored independently of each acquired image and before any image acquisition. Furthermore, a method according to the invention associates with each characteristic value a specific compression algorithm particularly suited to the type of image being processed.

A method according to the invention makes it possible to optimize the use of resources and defines a global strategy for reducing the amount of data transmitted to the ground. A method according to the invention goes beyond simple image compression. In particular, a method according to the invention reduces an image before transmitting it to the ground. Such image reduction comprises a step of processing the image, referred to throughout the text as a preprocessing step, and a step of compressing this preprocessed image. This initial processing makes it possible to provide an image referred to as a preprocessed image. This step may consist in spatial filtering of the image, thresholding of the image, suppression of a part of the image, and in general any processing of the image with a view to suppressing the data not required for a person to understand the image.

In particular, advantageously, a method according to the invention comprises, for each image, a step of recognizing predetermined natural objects (in particular by recognizing predetermined shapes and/or textures etc. of landscapes) in the image, referred to as original objects, and a subsequent step of the substituting substitute objects for these original objects. These substitute objects may be predetermined objects or objects determined on the basis of the original objects.

These steps are advantageously carried out during the step of preprocessing the image. Thus, the preprocessing step consists in recognizing particular original objects of landscapes in the image. These original objects are for example clouds, wooded regions, beaches, ponds, buildings, grasslands, snow-covered areas, roads, forest tracks, etc. This preprocessing step then, for example, advantageously substitutes for each recognized original object one or more pixels characteristic of this detected original object. This preprocessing step may be specific to the intended objective of the observation. In particular, if the acquired and preprocessed image is intended to reveal only green spaces, the preprocessing step may then attempt only to detect the objects (in particular by their particular shapes and/or textures) which are not green spaces (ponds, beaches, etc.) and replace each of these objects with one or more pixels having characteristic colors (uniform region(s)). These regions can thus be coded with fewer bytes than before substitution, but without degrading the quality of the image with a view to the intended objective of the observation.

According to another variant, the substitution may consist in replacing the detected object with a predetermined image. For example, each beach detected is replaced with a predetermined beach image so that the visual impression of the image is preserved.

Thus, in a method according to the invention, said standardized objects are advantageously selected from predetermined images and uniform regions.

This substitution step makes it possible to drastically reduce the number of bytes necessary for coding the image and/or to increase the quality of the unsubstituted elements. This is because, since the substituted regions require fewer bytes, the unsubstituted regions can be coded more finely with an equivalent number of bytes for the overall image.

A method according to the invention comprises a subsequent step of compressing the preprocessed image. The compression algorithms may be of all types, and are determined as a function of the intended objectives of the imagery. The compression algorithms may be determined so that the amount of data per unit time sent by a satellite implementing a method according to the invention is variable within predetermined limits. The algorithms may also be determined so that the average data rate sent by a satellite implementing a method according to the invention is constant.

Advantageously and according to the invention, at least one algorithm—in particular each algorithm corresponding to a characteristic value—is a psycho-visual compression algorithm.

Compression of the psycho-visual type, that is to say compression which keeps only the information useful for a human to understand the image, is particularly effective given that it not only provides a compression function which makes it possible to drastically reduce the amount of data to be transmitted to a remote image reception device, but it also provides an additional function of processing the acquired images, for example under cloud cover and sea images. In the case in point, if a satellite acquires an image obscured by heavy cloud cover, compression algorithm of the psycho-visual type makes it possible to obtain strong compression of the image without a specific procedure. Likewise, compression of the psycho-visual type obviates the need for an instrument according to the invention to have a specific day/night program which prevents imagery at night. This is because an image of a region taken at night is strongly compressed by a compression module of the psycho-visual type.

If the characteristic value of the image reveals that it is an image of a maritime region, the selected compression algorithm compresses the image very strongly while keeping enough information for the user to recognize that it is a maritime region. Furthermore, the psycho-visual compression algorithm eliminates only the superfluous information, so that if the image contains a ship, the latter is kept by the compression algorithm.

A method according to the invention adapts the level of compression and the type of compression to the type of image acquired. The compression factor, defined as the gain in volume in relation to the initial volume of the data, may vary greatly as a function of the images acquired. For an urban region, in particular, according to the invention the compression factor is of the order of 0.15, while for cloudy regions it is of the order of 0.95.

A satellite in low orbit, which takes systematic images of the overflown regions, can reduce the amount of data to be transmitted to the ground by more than 50%, on average per orbit, with an acquisition, compression and transmission method according to the invention. The Inventors have observed that the amount of data transmitted by a satellite in low orbit which takes systematic images, and which implements a method according to the invention, is of the order of the amount of data transmitted by a satellite in low orbit which takes selective images, even though the amount of information contained in the transmitted data is much greater given that the entire orbit of the satellite is imaged. Thus, with an equivalent bandwidth, a satellite implementing a method according to the invention can provide much more usable information than a satellite implementing a method of the prior art. With an equivalent amount of information transmitted to the ground, a satellite implementing a method according to the invention uses less bandwidth than a satellite implementing a method according to the prior art.

A method according to the invention is particularly suited to instruments intended to take images of the entire globe.

The characteristic values of the images, representative of the content of the images, may be of all types.

Advantageously and according to the invention, the characteristic value of an image is representative of one of the following characteristics:
  texture of the image,
  spatial frequency power of the image,
  average luminance of the image,
  average contrast of the image,
  predominant color of the image,
  degree of uniformity of the colors of the image,
  complexity of the image,
  entropy of the image.

According to a variant of the invention, the characteristic value of the image may depend on one or more of the characteristics mentioned above.

It should be noted that the method according to the invention makes it possible (preprocessing step) to take the analysis of the content of the image into account with a view to optimizing the compression, in relation to semantic parameters specific to the application, namely the observation of terrestrial landscapes, by detecting in the acquired image natural objects selected from:
  aquatic regions (seas, lakes, rivers, etc.),
  snow-covered surfaces,
  glaciers,
  clouds,
  uniform desert regions (dunes, etc.),
  uniform vegetation regions (forests, cultivations, etc.),
  and in general any specific natural element allowing advantageous mechanisms (substitution step) to be employed in order to increase the compression factor of the image and reinforce the performance of the compression.

Advantageously and according to the invention, the compression algorithms are selected from the group comprising:
  a DCT compression (Discrete Cosine Transform),
  a wavelet compression,
  a fractal compression.

Advantageously and according to the invention, for each image, the image processing means are adapted to process a sequence of images which were acquired before this image, so that said characteristic value of this image depends on this image and this sequence of previously acquired images. Thus, a method according to the invention can determine the characteristic value of an image not only according to the intrinsic content of the image, but also according to the contents of images acquired before this image. In particular, if the successive images are close in terms of content it is not necessary to preserve the entire content of the subsequent images. Thus, if during the processing of an image it is found that the previously acquired images have a similar content to this image—which is the case when flying over a relatively uniform large region—the preprocessed image may contain only the elements which are different to the previous images and an indication that the initial image is the sum of a previous image and these additional elements.

The invention also relates to an instrument for acquisition, compression and transmission of Earth observation satellite images, which comprises:
  means for systematic acquisition of images,
  means for processing each acquired image, which are adapted to provide a preprocessed image and at least one characteristic value of the image representative of its content, the processing means being adapted to recognize predetermined natural objects in the acquired image and to replace these natural objects with standardized objects,
  means for comparing each characteristic value with a table of values, each value of which is associated with a specific compression algorithm,
  means for compressing each preprocessed image, implementing the compression algorithm corresponding to the characteristic value of the image,
  means for transmitting the compressed image to a remote image reception device.

The image acquisition means of an instrument according to the invention are advantageously optical cameras equipped with CCD sensors. The processing means are advantageously digital means associated with a microprocessor. The comparison means are advantageously digital means associated with means for storing the value correspondence table, this storage being local or remote. The compression means are advantageously digital means associated with a microprocessor. The transmission means are advantageously radiofrequency means for transmission of data between a satellite and the Earth.

An instrument according to the invention advantageously carries out a method according to the invention, and a method according to the invention is advantageously carried out by an instrument according to the invention.

The invention also relates to a method for acquisition, compression and transmission of Earth observation satellite images and to an instrument carrying out such a method, which are characterized in combination by or some of the characteristics mentioned above or below.

BRIEF DESCRIPTION OF THE DRAWING FIGURES

Figure 2A:
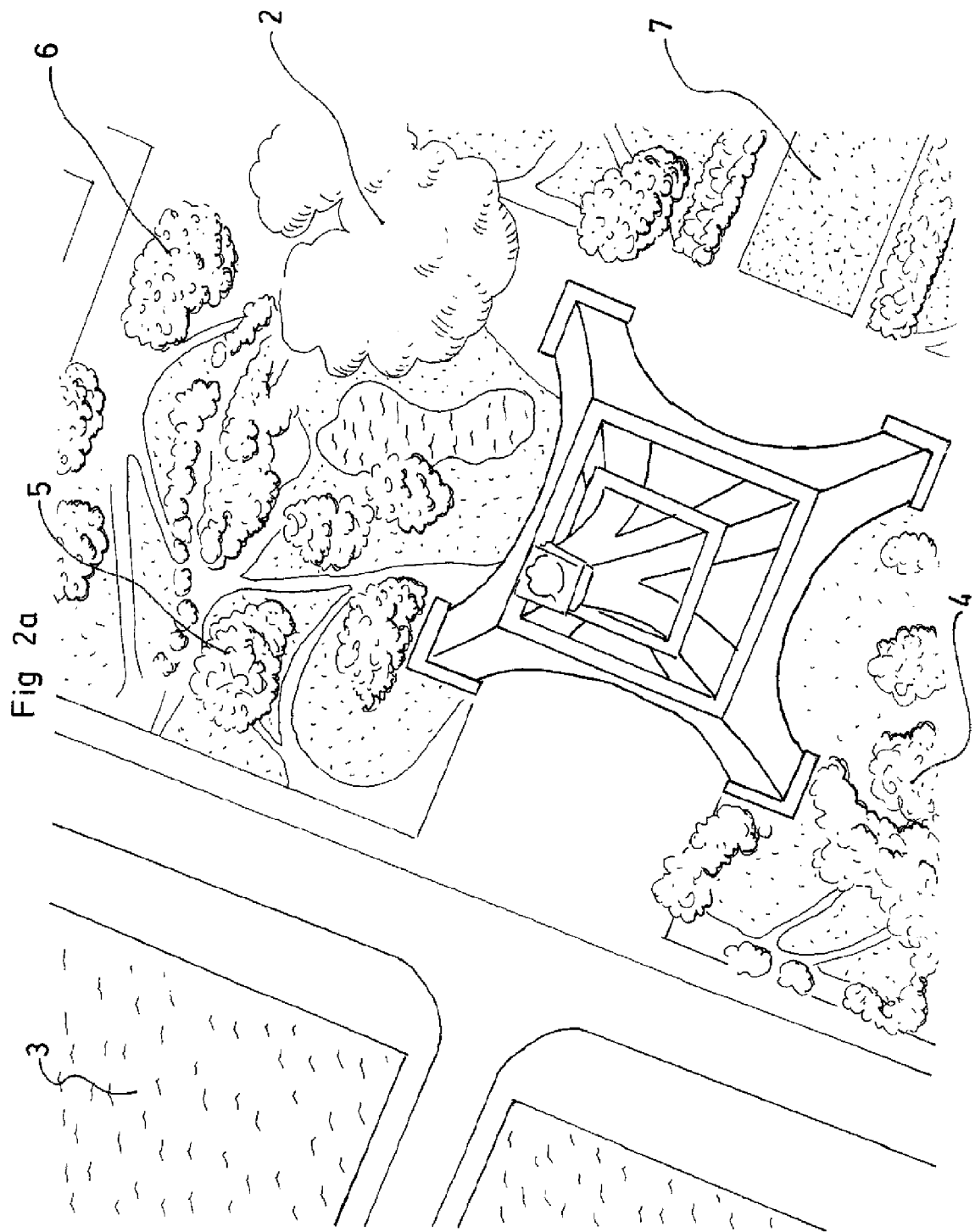
Figure 2B:
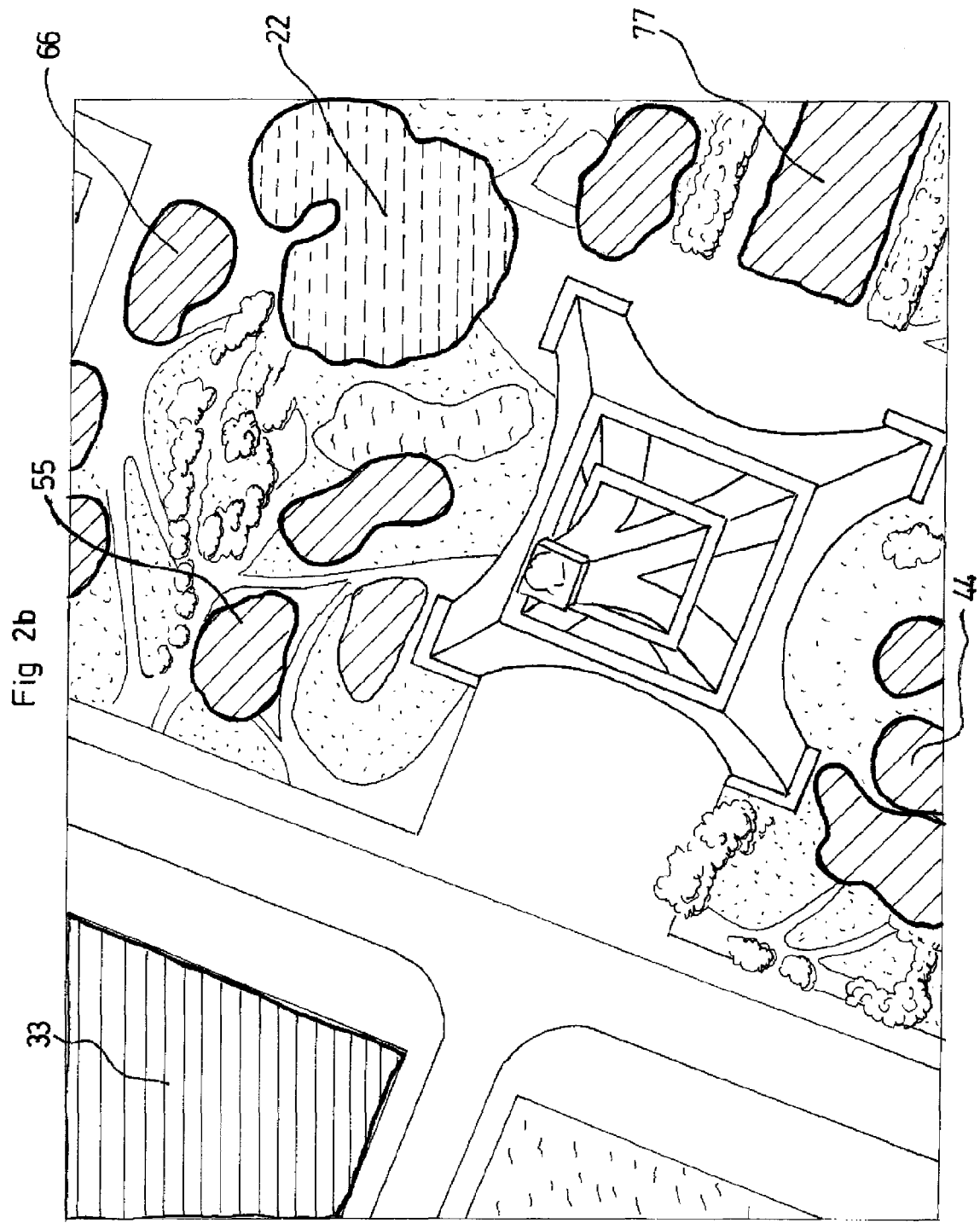

Other characteristics, objects and advantages of the invention will become apparent on reading the following description which is given only by way of non-limiting example and refers to the appended drawings, in which:

FIG. 1 is a schematic flow chart of a method for acquisition, compression and transmission of satellite images according to the invention, FIG. 2a is a schematic view of an image of an urban region, and FIG. 2b is a schematic view of the same image once processed by a method according to the invention.

DETAILED DESCRIPTION OF THE INVENTION

A method for acquisition, compression and transmission of satellite images according to the invention comprises, as represented in FIG. 1, a first step 101 of image acquisition in which an image is acquired by an instrument.

A method according to the invention comprises a subsequent step 102 of processing this image with a view to providing a numerical value, referred to as the characteristic value of the image, representative of the content of this image. This characteristic value may be of all types. It may correspond, for each image, to the texture of the image, the spatial frequency power of the image, the average luminance of the image, the average contrast of the image, the predominant color of the image, the degree of uniformity of the colors of the image, the complexity of the image, the entropy of the image or a function of two or more of these parameters. According to one embodiment of the invention, the image may be divided into a multitude of subimages and a characteristic value of the image may be calculated for each of these subimages.

This processing step 102 also makes it possible to provide a preprocessed image. This preprocessing may consist in a spatial filtering of the image, thresholding of the image, suppression of certain objects of the image, and in general a specific processing operation contributing to reduction of the amount of data transmitted to the ground, but without losing information which is useful for a person.

FIGS. 2a and 2b respectively present an example of an image acquired by an instrument fitted on board a satellite, and the same image preprocessed by a method according to the invention.

FIG. 2a is a view of the Eiffel Tower on which, besides the Eiffel Tower, a cloud 2, a part 3 of the Seine, wooded regions 4, 5, 6, and a lawn 7 can be seen.

FIG. 2b presents the same view, the image having been preprocessed during the preprocessing step 102 of a method according to the invention. It can be seen that the cloud 2 has been detected and substituted by a uniform white region 22. Likewise, the part 3 of the Seine has been detected and replaced with a uniform region 33. The wooded regions 4, 5, 6 have been detected and replaced with regions 44, 55, 66 which are also uniform. A method according to the invention has made it possible to recognize natural objects and replace them with standardized objects (the uniform regions 22, 33, 44, 55, 66, 77) so that the amount of data necessary for storing the image of FIG. 2b is much less than the amount of data necessary for storing the image of FIG. 2a. Furthermore, the relevant data of Image 2a are preserved in Image 2b.

In general, the preprocessing step 102 makes it possible to recognize objects in the image (in particular by particular shapes and/or textures of landscapes). This recognition may be carried out according to methods for recognition (automatic or manual (with human intervention)) of objects in images on the basis of relevant parameters making it possible to identify the object. These objects are for example clouds, wooded regions, beaches, ponds, buildings, grasslands, snow-covered areas, roads, forest tracks, etc. This preprocessing step then advantageously substitutes for each detected object a predetermined standardized object, in particular a predetermined image or a predetermined uniform region (which may correspond to a uniform representation of the natural object detected or to a region of the image which is deleted, the object being suppressed). For example, each cloud 2 detected in Image 2a is replaced with an image of a predetermined cloud so that the visual impression of Image 2b is substantially identical to Image 2a even though the number of bytes necessary for storing the image on a bulk medium is greatly reduced.

A method according to the invention comprises a subsequent step 103 of comparing the characteristic value calculated in step 102 with a table of values, referred to as a correspondence table, each element of the correspondence table being associated with a specific compression algorithm. The purpose of the characteristic value of the image, or the function of characteristic values of the image, is to characterize the type of image acquired so as to adapt the compression to this image. A specific algorithm is associated with each value of the correspondence table. The correspondence table may comprise a large number of mutually different algorithms. Furthermore, different values may be associated with the same algorithms, with only the parameters of the algorithm such as the compression factor, for example, distinguishing the algorithms from one another for these values.

The correspondence table defines, for example, a plurality of value ranges, each range of which is associated with a compression algorithm. Thus, if the characteristic value evaluated in step 102 belongs to a given range of values, the compression algorithm used in step 104 is the algorithm associated with this range of values to which the characteristic value of the image belongs.

A method according to the invention comprises a subsequent step 104 of compressing the preprocessed image by the selected compression algorithm corresponding to the characteristic value determined in step 102. The algorithms used may be of all known types. According to a preferred embodiment of the invention, however, the algorithm designated in step 103 is a compression algorithm of the psycho-visual type. Such an algorithm is for example, for a given characteristic value, the algorithm known by the name "JPEG 2000".

A method according to the invention comprises a subsequent step 105 of transmitting the image compressed in step 104 to a remote image reception device. Such an image reception device is, for example, a ground receiver station.

According to the invention, the image acquisition may be carried out by all known means.

The processing of the acquired images is preferably carried out by digital means associated with a microprocessor. In particular, this processing consists in analyzing the image in order to extract from it at least one characteristic value of the image, representative of this image. The characteristic value of the image may correspond to the texture of the image, the spatial frequency power of the image, the average luminance of the image, the average contrast of the image, the predominant color of the image, the degree of uniformity of the colors of the image, the complexity of the image, etc.

The compression algorithms may be DCT, wavelet, fractal compression algorithms etc. These algorithms are known to the person skilled in the art and are not described in detail here.

The invention extends to an instrument carrying out a method according to the invention. Such an instrument for acquisition, reduction and transmission of satellite images comprises means for systematic acquisition of images, means for processing each image, which are adapted to provide a preprocessed image and at least one digital value, referred to as the characteristic value of the image, representative of the content of the image, means for comparing each characteristic value with a table of values, each value of which is associated with a specific image compression algorithm, means for compressing each preprocessed image, implementing the compression algorithm corresponding to the characteristic value of the image, and means for transmitting the image to a remote image reception device.

The image acquisition means may be of all types. According to a preferred embodiment of the invention, these acquisition means are digital cameras carried by satellites and adapted to take images of the terrestrial surface. The means for preprocessing, image processing and image compression are, according to a preferred embodiment, implemented by software means. The image transmission means are known to the person skilled in the art and are not described in detail here.

An instrument according to the invention carries out a method according to the invention, and a method according to the invention is advantageously carried out by an instrument according to the invention.

The invention is not only limited to the embodiments described. In particular, a method according to the invention may comprise all types of substitution of detected natural elements during the image preprocessing step. Furthermore, the means for detecting these natural elements may be of all types, in particular depending on the shape of the elements, the color of the elements, the texture of the elements, the frequency power of the elements, the contrast of the elements, the predominant color of the elements, the degree of uniformity of the colors of the elements, the complexity of the elements, etc.

The invention claimed is:

1. A method for acquisition, processing, compression and transmission of Earth observation satellite images, comprising:
　　acquiring an image, named acquired image, by an instrument carried by a satellite,
　　processing said acquired image by an image preprocessing step adapted to provide a preprocessed image and at least one numerical value, referred to as the characteristic value of said acquired image, representative of a content of said image, said preprocessing step comprising a step of recognizing predetermined natural objects in said acquired image and a subsequent step of substituting standardized objects for said natural objects,
　　comparing said characteristic value with a table of values, each value of which is associated with a compression algorithm,
　　employing said compression algorithm corresponding to said characteristic value in order to compress said preprocessed image to provide a compressed image, and
　　transmitting said compressed image to a remote image reception device.

2. The method as claimed in claim 1, wherein said standardized objects are selected from predetermined images and uniform regions.

3. The method as claimed in claim 2, wherein said standardized objects are selected from:
　　aquatic regions, seas, lakes, rivers,
　　snow-covered surfaces,
　　glaciers,
　　clouds,
　　uniform desert regions, dunes,
　　uniform vegetation regions, forests,
　　objects, boats, and offshore platforms.

4. The method as claimed in claim 1, wherein said standardized objects are selected from:
　　aquatic regions, seas, lakes, rivers,
　　snow-covered surfaces,
　　glaciers,
　　clouds,
　　uniform desert regions, dunes,
　　uniform vegetation regions, forests,
　　objects, boats, and offshore platforms.

5. The method as claimed in claim 1, wherein, for said acquired image, said image preprocessing step is adapted to preprocess a sequence of images which were acquired before said acquired image, so that said characteristic value of said acquired image depends on said acquired image and said sequence of images which were acquired before said acquired image.

6. The method as claimed in claim 1, wherein at least one said compression algorithm is a psycho-visual compression algorithm.

7. The method as claimed in claim 6, wherein each said compression algorithm is a psycho-visual compression algorithm.

8. The method as claimed in claim 1, wherein said characteristic value of said image is selected from the group consisting of a texture of said acquired image, a spatial frequency power of said acquired image, an average luminance of said acquired image, an average contrast of said acquired image, a predominant color of said acquired image, a degree of uniformity of the colors of said acquired image, a complexity of said acquired image, and an entropy of the image.

9. The method as claimed in claim 1, wherein the compression algorithms corresponding to said characteristic values are selected from the group consisting of discrete cosine transfer algorithms, wavelet algorithms and fractal algorithms.

10. An instrument for acquisition, compression and transmission of satellite images, which comprises:
　　means for systematic acquisition of images,
　　means for processing each acquired image, which are adapted to provide a preprocessed image and at least one characteristic value of the image representative of its content, the processing means being adapted to recognize predetermined natural objects in the acquired image and to replace these natural objects with standardized objects, means for comparing each characteristic value with a table of values, each value of which is associated with a specific compression algorithm, means for compressing each image, implementing the compression algorithm corresponding to the characteristic value of the image, and means for transmitting the image to a remote image reception device.

11. An instrument for acquisition, compression and transmission of satellite images, which comprises:

an optical camera configured for systematic acquisition of images, a processor configured for processing each acquired image, which are adapted to provide a preprocessed image and at least one characteristic value of the image representative of its content, the processor being adapted to recognize predetermined natural objects in the acquired image and to replace these natural objects with standardized objects, a processor configured for comparing each characteristic value with a table of values, each value of which is associated with a specific compression algorithm, a processor configured for compressing each image, implementing the compression algorithm corresponding to the characteristic value of the image, and a radiofrequency transmitter configured for transmitting the image to a remote image reception device.

12. The instrument as claimed in claim 11, wherein said standardized objects are selected from predetermined images and uniform regions.

13. The instrument as claimed in claim 11, wherein said standardized objects are selected from:

aquatic regions, seas, lakes, rivers,
snow-covered surfaces,
glaciers,
clouds,
uniform desert regions, dunes,
uniform vegetation regions, forests, objects, boats, and offshore platforms.

14. The instrument as claimed in claim 11, wherein, for said acquired image, said image preprocessing step is adapted to preprocess a sequence of images which were acquired before said acquired image, so that said characteristic value of said acquired image depends on said acquired image and said sequence of images which were acquired before said acquired image.

15. The instrument as claimed in claim 11, wherein at least one said compression algorithm is a psycho-visual compression algorithm.

16. The instrument as claimed in claim 15, wherein each said compression algorithm is a psycho-visual compression algorithm.

17. The instrument as claimed in claim 11, wherein said characteristic value of said image is selected from the group consisting of a texture of said acquired image, a spatial frequency power of said acquired image, an average luminance of said acquired image, an average contrast of said acquired image, a predominant color of said acquired image, a degree of uniformity of the colors of said acquired image, a complexity of said acquired image, and an entropy of the image.

18. The method as claimed in claim 11, wherein the compression algorithms corresponding to said characteristic values are selected from the group consisting of discrete cosine transfer algorithms, wavelet algorithms and fractal algorithms.

* * * * *